United States Patent [19]

Beene et al.

[11] Patent Number: 4,606,031

[45] Date of Patent: Aug. 12, 1986

[54] DEVICE FOR FREQUENCY MODULATION OF A LASER OUTPUT SPECTRUM

[75] Inventors: James R. Beene; Curtis E. Bemis, Jr., both of Oak Ridge, Tenn.

[73] Assignee: The United States of America as represented by the United States Department of Energy, Washington, D.C.

[21] Appl. No.: 631,693

[22] Filed: Jul. 17, 1984

[51] Int. Cl.[4] ............................................... H01S 3/10
[52] U.S. Cl. ........................................ 372/28; 372/32; 372/20; 372/54; 372/24; 372/70
[58] Field of Search ................... 372/28, 32, 20, 70, 372/60; 378/54, 24

[56] References Cited

U.S. PATENT DOCUMENTS

| 4,081,765 | 3/1978 | Berg et al. | 372/20 |
|---|---|---|---|
| 4,150,342 | 4/1979 | Johnston, Jr. et al. | 372/20 |
| 4,187,475 | 2/1980 | Wieder | 372/54 |
| 4,272,734 | 6/1981 | Jarrett et al. | 372/32 |
| 4,509,132 | 4/1985 | Kavaya | 372/32 |

OTHER PUBLICATIONS

Jitschin et al; "Fast Freq. Control of a CW Dye Jet Laser"; *Appl. Phys.*, 19(2) p. 181, 1979 (Feb.).
Jarrett et al; "Freq.-Stabilized CW Ring Dye Laser"; *SPIE V.* 247 *Proc. Soc. Photo-Opt. Inst. Eng.* (1980).
Jitschin et al; "Narrow-Bandwith CW Dye Laser with High Output Power"; *SPIE V.* 164 *Fourth Europ. Electro-Opt. Conf.*, Oct. '78, p. 17.

*Primary Examiner*—Leon Scott, Jr.
*Attorney, Agent, or Firm*—David E. Breeden; Stephen D. Hamel; Judson R. Hightower

[57] ABSTRACT

A device is provided for fast frequency modulating the output spectrum of multimode lasers and single frequency lasers that are not actively stabilized. A piezoelectric transducer attached to a laser cavity mirror is driven in an unconventional manner to excite resonance vibration of the transducer to rapidly, cyclicly change the laser cavity length. The result is a cyclic sweeping of the output wavelength sufficient to fill the gaps in the laser output frequency spectrum. When such a laser is used to excite atoms or molecules, complete absorption line coverage is made possible.

3 Claims, 2 Drawing Figures

DEVICE FOR FREQUENCY MODULATION OF A LASER OUTPUT SPECTRUM

BACKGROUND OF THE INVENTION

This invention, which is a result of a contract with the United States Department of Energy, relates generally to improvements in continuous wave lasers and more specifically to improvements in the output frequency spectrum of these lasers.

In several fields such as fusion energy and nuclear and high energy physics, laser optical power is used to raise the energy of selected chemical species by directly exciting specific atoms or molecules to one or more high energy states. Atoms or molecules to be optically excited are characterized by absorption line profiles which can be very broad, i.e., several gigahertz.

Such broad profiles are outside the range of single mode (single frequency) lasers. Instead, a broadband laser would be required to achieve overlap of the entire absorption profile of the desired transition. In other words, the output linewidth of a standing wave broadband laser can generally be tailored to match the width of a desired absorption profile through the use of intracavity filters.

It is the nature of standing wave lasers, however, that their output power spectrum is not a continuum of wavelengths. Instead, resonance waves in the laser produce an output spectrum that unavoidably consists of discrete wavelengths separated by gaps. The number of these discrete wavelengths, or longitudinal modes, depends on the cavity length of the laser. Typically, some 50 to 100 modes spaced approximately 200 MHz apart may be produced by a continuous wave dye laser.

In addition, mode competition in the laser and in laser active medium may prevent all possible modes from lasing simultaneously, thereby further aggravating the problem of the gaps within the output spectrum.

This drawback of broadband lasers has kept them from being widely used in laser-atom excitation applications. Instead, several adaptations of single frequency lasers have been made in attempts to increase the laser-atom interaction efficiency.

SUMMARY OF THE INVENTION

It is a primary object of this invention to provide a means for efficiently and adequately filling the gaps in the output frequency spectrum of a laser.

Other objects and many of the attendant advantages of the present invention will be apparent to those skilled in the art from the following detailed description taken in conjunction with the drawing.

Briefly, the invention consists of driving a piezoelectric transducer (PZT) physically attached to an intracavity mirror of a continuous wave laser with a signal tuned to excite mechanical resonance vibration of the transducer. The PZT effects cyclic cavity length changes which in turn changes tne laser output wavelength accordingly. The piezoelectric transducer and coupled mirror are driven with a low amplitude excitation and at a frequency which corresponds to that of one of the characteristic frequencies of mechanical resonance of the transducer. This results in frequency modulation of the laser output to fill the gaps in the laser output frequency spectrum.

DESCRIPTION OF THE PREFERRED EMBODIMENT

Figure 1:
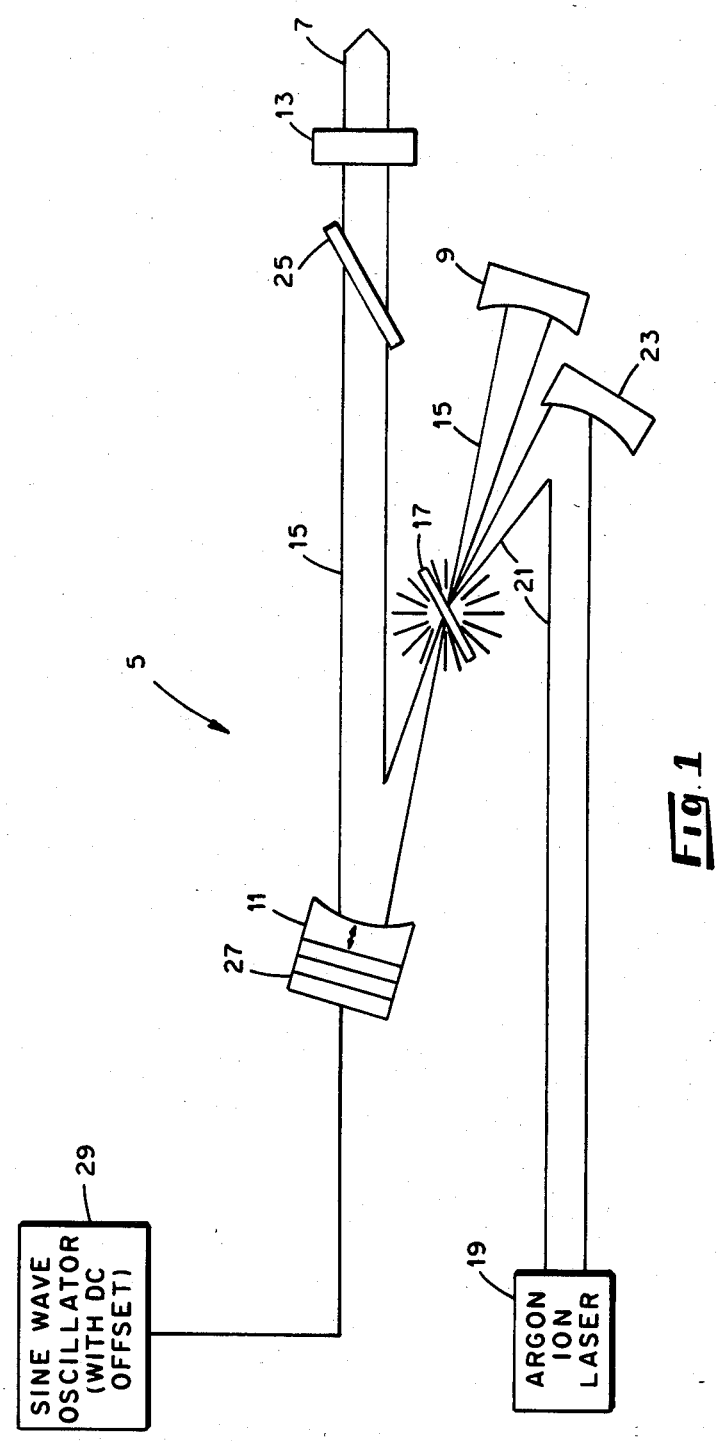
FIG. 1 is a block diagram of a continuous wave dye laser of the standing wave type which has been modified in accordance with the present invention to provide frequency modulation of the output beam.

A broadband continuous wave (cw) dye laser 5 is shown in FIG. 1 which has been modified in accordance with the present invention to provide a frequency modulated output beam 7. Although the invention is illustrated by means of a standing wave, cw dye laser, it will be understood that the invention is applicable to various other lasers such as ring dye lasers, gas lasers, solid state lasers, etc., of the continuous wave type.

The laser cavity includes high reflecting mirrors 9 and 11 and a partially reflecting output coupler 13 between which a standing wave beam 15 reflects back and forth between mirror 9 and coupler 13 via mirror 11. The cavity length, i.e., the distance the beam travels from reflector 9 to reflector 11 and to coupler 13, is set in accordance with the desired intracavity optical properties of the laser, such as focussing, etc, in a conventional manner.

The laser active medium, in the form of a dye jet 17, is disposed in the beam path 15 between the mirrors 9 and 11. The lasing action is produced by means of a pumping beam from an ion laser source 19 directed along beam path 21 by means of a pump beam mirror 23. The lasing light produced in the jet stream then produces the standing wave light beam in path 15. A birefrigent filter 25 is introduced into the beam 15 for selective gross tuning of the output bandwidth.

In accordance with the present invention, one of the mirrors forming the laser resonant cavity length, in this case mirror 11, is provided with a piezoelectric transducer (PZT) 27. The PZT may be bonded to the back of the mirror and mounted to effect cavity length changes when an excitation signal is applied to the PZT. This action of the PZT in turn changes tne wave length of the output beam 7. It has been found that when the PZT is driven at a low amplitude excitation, by means of a sine wave oscillator 29 tuned to a frequency which corresponds to a characteristic frequency of mechanical resonance of the PZT, the transducer-mirror assembly will vibrate at that frequency, thereby frequency modulating the output wavelength of the laser.

Turning briefly from the invention to single frequency lasers, commercially available mirror mounted PZT's are commonly used to effect linear cavity length changes to stabilize the laser output frequency by connection in a feedback network which adjusts the mirror to compensate for small disturbances in the cavity which affect the output wavelength. One system of this type is described in U.S. Pat. No. 4,272,734 issued June 9, 1981 to Steven M. Jarrett et al for Dual Reference Interferometer for Dye Laser Stabilization, the subject matter of which . is incorporated herein by reference thereto. In systems of this type, a linear response of the PZT motion to a wavelength error signal is required, and mechanical resonances are absolutely avoided. Typically, these PZT transducers are formed by stacking a number of piezoelectric crystals to obtain the desired degree of displacement. Typical transducers driven at frequencies well below the lowest mechanical resonance have a linear response motion with applied voltage of approximately 5 to 10 micrometers per 1,000 volts. The exact frequencies required to induce resonance in a PZT transducer of this type depends upon the construction and mounting of the transducer and the mass and size of the mirror bonded to the transducer. Typically, in transducers used for intracavity stabilization, longitudinal mechanical resonance often occurs at frequencies in the range of from 40 to 400 kHz. When driven at these frequencies with the normal applied voltages, the transducer response at resonance maybe 100 times greater, thereby destroying the transducer. To avoid this, the PZT's are normally supplied with trapping filters which prevent the application of high frequency signals. In order to use these commercially available units in accordance with the present invention, the filter is removed or bypassed and the transducer is excited by applying a low amplitude drive signal at one of the mechanical resonance frequencies to provide extremely rapid oscillatory length changes, thus sweeping the wavelength of particular modes to fill the gaps between the discrete longitudinal modes of the laser.

As an example of the operation of this invention, consider a broadband, cw, standing wave dye laser as shown in FIG. 1 having a resonant cavity length of 75 cm and normally operating with an output centered about a wavelength 460 nm and a longitudinal mode spacing of about 200 MHz. If the PZT 27 is resonantly driven at a longitudinal mechanical resonance of, for example, 350 kHz, and the amplitude of the driving voltage is 3 or 4 volts, about a +5 volt dc offset, to prevent a negative drive voltage, cavity length changes of $\pm 5$ to $\pm 10$ $\mu$m can be realized at the resonant frequency of 350 kHz. Since, in this example, a 5 $\mu$m cavity length change corresponds to an optical frequency change of $\pm 2$ GHz, i.e., $\pm 10$ longitudinal cavity modes of 200 MHz, the wavelength of a particular cavity mode has been oscillated by $\pm 2$ GHz. Thus, an optical frequency gap of 200 MHz between normal stationary longitudinal modes is completely covered in a time of approximately 150 nanoseconds.

Figure 2:
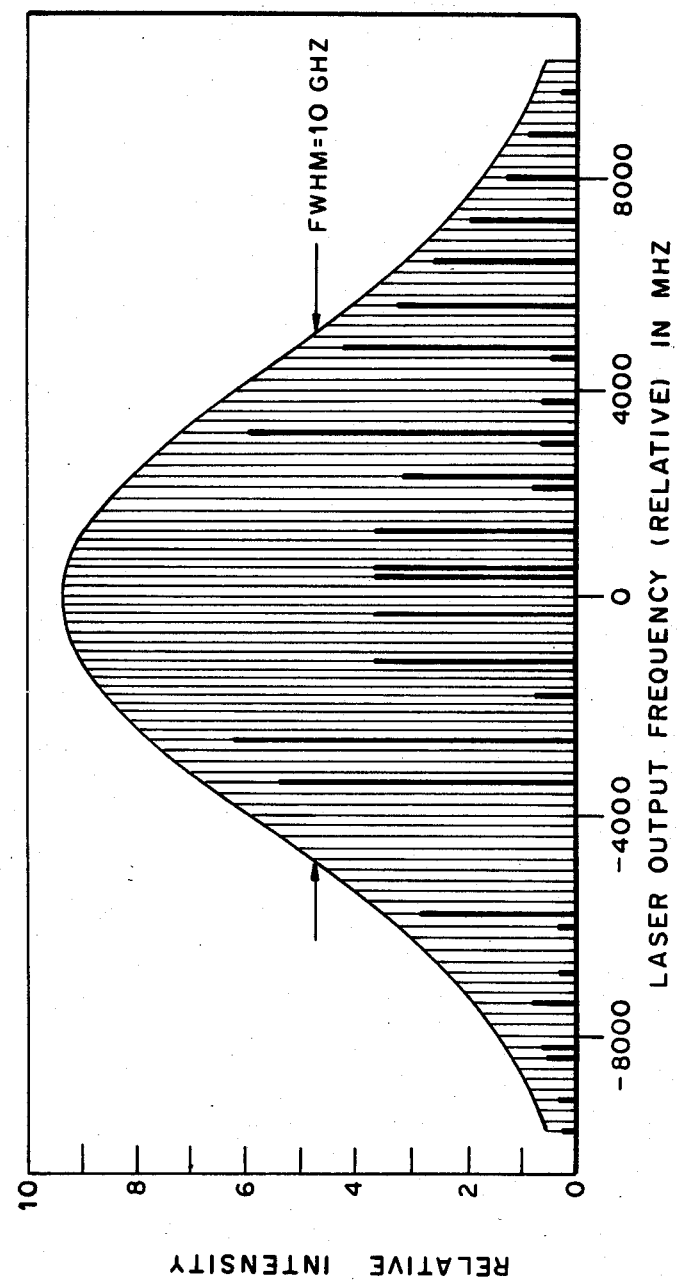
FIG. 2 is a graph which illustrates the improvement in the output of a cw dye laser by comparing the typical output modes shown by thick lines and the filled envelope of excited modes at 200 MHz's spacing when the output beam is modulated in accordance with the present invention.

The graph of FIG. 2 illustrates the improvement in the output of a typical cw dye laser due to the frequency modulation according to the present invention. The heavy lines illustrate the typical laser output without the invention. The envelope is typical of the laser output when frequency modulation is applied.

Frequency modulation of the laser output is initiated by applying a 3 or 4 volt signal which oscillates about a dc offset to the PZT 27 while observing the line pattern of the laser output spectrum on an oscilloscope connected to the output of a spectrum analyzer. The frequency of the input signal is increased until a condition is induced in the PZT, which is observed by a sudden jitter in the output spectrum line pattern. Once this frequency is determined it may not be necessary to tune the input frequency in subsequent operation of tne laser. The sine wave source may be a fixed frequency source once the required frequency for oscillatory drive of a PZT-mirror arrangement has been established.

Thus, it will be seen that a very simple, inexpensive and effective means has been provided for fast frequency modulation of the output spectrum of a cw laser. The invention is applicable to multimode lasers as well as to single frequency lasers that are not actively stabilized. No loss in laser power occurs since no intraor extracavity modulators, which cause transmission losses, are required.

An additional benefit of using this fast FM technique is that it reduces or eliminates the effects of "spatial hole burning." This is an effect in standing wave cavities that modifies and enhances mode competition in particular frequency intervals which depend on cavity dimensions, mirror distances, and the resultant interfering standing wave patterns in the cavity. Reduction or elimination of "spatial hole burning" effects allows all longitudinal modes to be more equally favored, thus producing a more uniform or "flatter" multimode output spectrum.

We claim:

1. A device for frequency modulating the output of a dye laser, comprising:
   a continuous wave laser, having a resonant laser cavity including at least one mirror disposed for movement along an optical axis to alter the beam path of said cavity and thus the laser output wavelength;
   a piezoelectric transducer capable of mechanical resonance vibrations along a longitudinal axis thereof in the range of from about 40 to 400 kHz when excited by a low amplitude excitation signal of corresponding frequency applied to an input thereof, said transducer being coupled to said at least one mirror to vibrate said mirror along said optical axis when an excitation signal is applied thereto; and
   an oscillating voltage sine wave source connected to said input of said piezoelectric transducer for generating said excitation signal so that said at least one mirror is vibrated along said optical axis at a frequency equal to said mechanical resonance vibration frequency of said transducer, thereby frequency modulating the output of said dye laser.

2. The device of claim 1 further including means for providing a dc voltage offset of the output voltage sufficient to prevent a change in polarity of said voltage signal.

3. The device of claim 2 wherein said laser is a broadband laser capable of lasing in a plurality of modes and wherein said piezoelectric transducer is of a size sufficient to provide displacements of said mirror which produces length changes of said cavity sufficient to excite all modes within said band width.

* * * * *